Feb. 7, 1950     P. S. BALDWIN     2,496,260
WHEEL CYLINDER

Original Filed Feb. 10, 1942

Inventor:
Philip S. Baldwin,
Max Wall
Attorney.

Patented Feb. 7, 1950

2,496,260

UNITED STATES PATENT OFFICE 2,496,260

WHEEL CYLINDER

Philip Sidney Baldwin, Florence, Italy

Original application February 10, 1942, Serial No. 430,296, now Patent No. 2,444,181, dated June 29, 1948. Divided and this application July 24, 1947, Serial No. 763,368. In Italy March 24, 1942

9 Claims. (Cl. 309—23)

This application is a division of application Serial No. 430,296, filed February 10, 1942, now Patent No. 2,444,181, granted June 29, 1948, which was a continuation in part of application S. N. 143,805, now Patent No. 2,276,009, granted March 10, 1942.

This invention relates to improvements in wheel cylinders and more particularly to the arrangement and structure of the pistons and piston packings for the wheel cylinders.

An object of this invention is to provide a piston in which elastic packing rings are freely mounted between rigid piston members which are co-axial with the rings and are held together as a unit under yielding counteracting mechanical axial pressure.

Another object is to simplify the construction of the pistons to lower production costs and ensure maximum unification of the working parts.

Still another object is to provide packings for the pistons which are readily adaptable to relatively high temperatures without unduly increasing the frictional resistance to reciprocal movements in the cylinders.

Other objects and advantages of the invention will appear during the course of the following description.

These improvements may be put into practice in various ways, and in the accompanying drawing is illustrated by way of example a form of practical application of the invention to a wheel motor cylinder.

Figure 1:
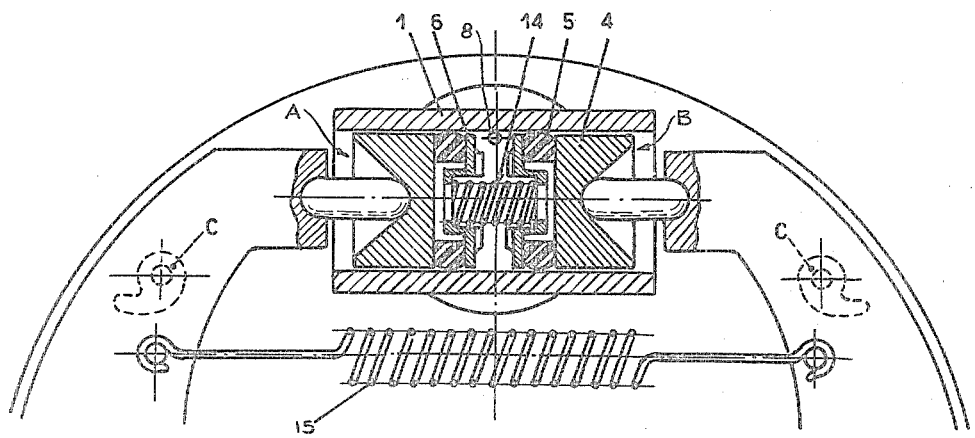
Fig. 1 is a longitudinal sectional view of a wheel cylinder with opposed pistons constructed according to the present invention.

As illustrated in Fig. 1 two opposed pistons A and B, each comprising elements 4, 5, 6 are mounted in a motor cylinder 1 as commonly located between the brake shoes in the wheels of motor vehicles, and is suitably connected with the master cylinder. They are held in spaced relation to each other at the centre of the cylinder 1 under counteracting pressure of the compensator spring 14 and the brake shoes return spring 15. The spacing of the opposed pistons at the centre of the cylinder may be secured by a cam registering device c commonly mounted against the inner rims of the brake shoes.

Figure 2:
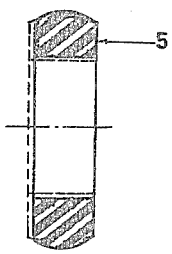
Fig. 2 is an enlarged longitudinal sectional view of the packing element of Fig. 1 showing thermic deformation of the element.

The counteracting mechanical pressure under which the opposed pistons A and B are mounted in the cylinder is sufficient to expand the packing rings 5 radially into permanent partial static contact with the cylinder wall at the apex of their elastic peripheries to ensure an initial hydraulic seal regardless of the thermal deformation of the rings. The fluid pressure takes effect on the piston assemblies 4, 5, 6, moving them in opposite directions and simultaneously expanding the packing rings into an effective dynamic seal against the cylinder wall. Upon release of pressure, the rings contract and the piston assemblies return to their starting positions under the urging of spring 15. In fact under the influence of braking heat which in the wheel cylinders may reach a temperature of 150 degrees centigrade or more, the elastic mass expands to a considerable extent and when packings are used which have a maximum free diameter equal to that of the cylinder bore, the radial thermal expansion will be rigidly resisted by the cylinder wall and an axial flow of the elastic mass will result. This flow produces a permanent deformation of the packings which, as indicated by the dotted lines on Fig. 2 will assume a free diameter at the apex of the periphery which is less than the diameter of the cylinder bore with a corresponding contraction in the elastic bore and an increase in the length. After this initial thermal deformation has taken place, the shape of the packings remains unchanged in subsequent heatings of like temperature and the counteracting radial and axial hydraulic pressure on the elastic bodies tends to keep it so, as already described.

As already indicated, the counteracting pressure of the compensator spring 14 and the brake shoes return spring 15 on the elastic packing rings tends to keep them in permanent partial static contact with the cylinder wall under all circumstances and thus provide a positive seal against escape of fluid and influx of air. Any radial thermal contraction of the rings is automatically taken up by the counteracting axial pressure of springs 14 which holds the freely mounted piston parts in engagement with one another and permits of their free return as a unit in the cylinder upon release of pressure, under action of the return spring. By keeping the mean free external diameter of the packing rings well under that of the cylinder bore, a piston with very low frictional resistance is secured even when subjected to heat and this ensures a prompt return of the pistons under release of the hydraulic pressure with consequent ready recovery of the brake shoes.

Owing to the structure of the elastic packing rings which have sufficient body to support of themselves the axial mechanical compression without buckling or twisting in the cylinder, rigid supports within the elastic bodies may be dispensed with and the rings may be freely mounted between their rigid terminals 4 and 6 as illustrated. This is important because such supports aggravate the thermal deformation by rigidly resisting the inner radial expansion of the rings and increasing the axial flow of the elastic mass which also increases the frictional resistance of the packings in the cylinder under heat. It might be noted in passing, moreover, that thermal deformation of the packings may be prevented altogether by fashioning them with a free maximum external diameter which is less than that of the cylinder bore, the difference in diameter being equal to or less than the factor of the thermal expansion of the packings. The axial compression of the compensator spring 14, however, must always be sufficient initially to expand the rings radially into partial static contact with the cylinder wall, as already described.

It is understood that the various constructions and arrangements of the parts as illustrated and described are submitted as practical embodiments of the working principles involved and may be modified as to details without departing from the spirit of the invention as defined by the appended claims.

What I claim is:

1. An hydraulic motor cylinder and a piston movable therein, an elastic sealing ring for the piston and a thrust member for the ring, mechanical means for supporting said ring between the piston and thrust member, the ring having a mean external diameter which is less than the diameter of the cylinder bore, the ring being freely mounted and yieldably supported between the piston and the thrust member by axial mechanical pressure and being unattached to the said piston and thrust member, the ring being subjected to axial and radial hydraulic pressure and being free to expand and contract during its reciprocal movements in the cylinder with the piston and thrust members.

2. An hydraulic motor cylinder, a piston a sealing ring and a thrust member slidable in the cylinder, means for yieldably supporting said ring between said piston and thrust member, the ring being freely mounted and yieldably supported between adjacent faces of the piston and thrust member under axial mechanical pressure, and being unattached to the piston and thrust member, the ring being initially and normally in partial contact with the cylinder wall and being subjected to axial and radial hydraulic pressure, said pressure causing the ring to expand and contract in its reciprocal movements in the cylinder with the piston and thrust member.

3. A motor cylinder, a piston movable therein, an elastic sealing ring for said piston having an annular inner and outer surface and two end faces, and a thrust member having an axial bore extending therethrough, means for yieldably supporting said ring between said piston and thrust member, the ring being freely mounted and yieldably supported by axially applied mechanical pressure between adjacent faces of the piston and thrust member and being unattached thereto, the said piston, ring and thrust member being free to slide as a unit in the cylinder, the annular outer surface of the ring being normally and initially partially spaced from the cylinder wall and being free to expand and contract under axial and radial hydraulic pressure, the said radial pressure taking effect through the thrust member bore on the inner annular surface of the ring and the said axial pressure on the end faces of same.

4. An hydraulic motor cylinder, a pair of pistons for the cylinder, an elastic sealing ring for each piston with a maximum mean external diameter which is less than the diameter of the cylinder bore, and a thrust member for each ring mechanical means within and outside of the cylinder for urging the pistons, rings and thrust members in opposite directions, each ring being freely mounted and yieldably supported between two adjacent faces of the piston and thrust member under counteracting axial mechanical pressure, being unattached to same and being free to slide in the cylinder as a unit with the piston and thrust member, one of the counteracting axial mechanical pressure means bearing on the thrust member and the other counteracting axial mechanical pressure means bearing on the piston, the ring being free to expand and contract under axial and radial hydraulic pressure in its slidable movements in the cylinder.

5. An hydraulic motor cylinder a piston movable therein and stop means limiting the retractile movement of the piston in the cylinder, an elastic sealing ring for the piston having two end faces and outer and inner annular surfaces, and a thrust member for the ring having an axial bore therethrough, the said piston ring and thrust member being slidable in the cylinder unit, the ring being freely mounted and yieldably supported between the piston and thrust member and unattached to same means for subjecting said ring to counteracting mechanical forces against said end faces, respectively, said ring having its outer annular surface initially and statically in partial contact with the cylinder wall and being free to expand and contract in the cylinder under counteracting axial and radial hydraulic pressure, the said radial pressure being applied to the inner annular surface of the ring through the axial bore of the thrust member and the said axial pressure being applied by means of the thrust member on the axial faces of the ring.

6. An hydraulic brake wheel motor comprising a cylinder and a piston operable therein, the piston including a head, a thrust member, and an expansible packing between said head and thrust member, said packing being physically unattached to said head or thrust member and being freely supported and self centering in the cylinder under the pressures developed therein, and being expansible into sealing contact with the cylinder wall to effect a fluid seal upon the application of hydraulic pressure thereto.

7. A wheel motor for a hydraulic brake system comprising a cylinder open at its ends, a pair of oppositely disposed pistons movable in said cylinder, said pistons each having an expansible packing, mechanical means for expanding said packings into static contact with the cylinder wall to prevent the escape of hydraulic fluid within the system, said packings being further expanded into dynamic and pressure sealing contact with the said cylinder wall on the application of working pressure to said motor.

8. A wheel motor for a hydraulic brake system comprising a cylinder, a pair of oppositely disposed pistons movable in said cylinder, said pistons each having an expansible packing, mechanical means for expanding said packings into static contact with the cylinder wall to prevent the escape of hydraulic fluid within the system, said packings being further expanded into dynamic and pressure sealing contact with said cylinder wall on the application of working pressure to said motor.

9. A wheel motor for a hydraulic brake system comprising a cylinder, a pair of oppositely disposed pistons movable in the cylinder, an inlet in the cylinder for introducing fluid under pressure thereto between said pistons, each piston including an expansible packing movable with said piston but not physically attached thereto, being freely supported and self centering in the cylinder, mechanical means between said packings tending to expand them into light static contact with the cylinder wall to prevent escape by seepage of the hydraulic fluid within the system, said packings being further expanded into dynamic and pressure sealing contact with said cylinder wall on the application of working pressure to said motor and packings.

PHILIP SIDNEY BALDWIN.

REFERENCES CITED

The following references are of record in the file of this patent:

UNITED STATES PATENTS

| Number | Name | Date |
|---|---|---|
| 2,326,116 | Baldwin | Aug. 10, 1943 |